May 24, 1932.  C. T. HENDERSON  1,859,442
APPARATUS FOR CONTROLLING GAS FLOW
Filed May 3, 1929
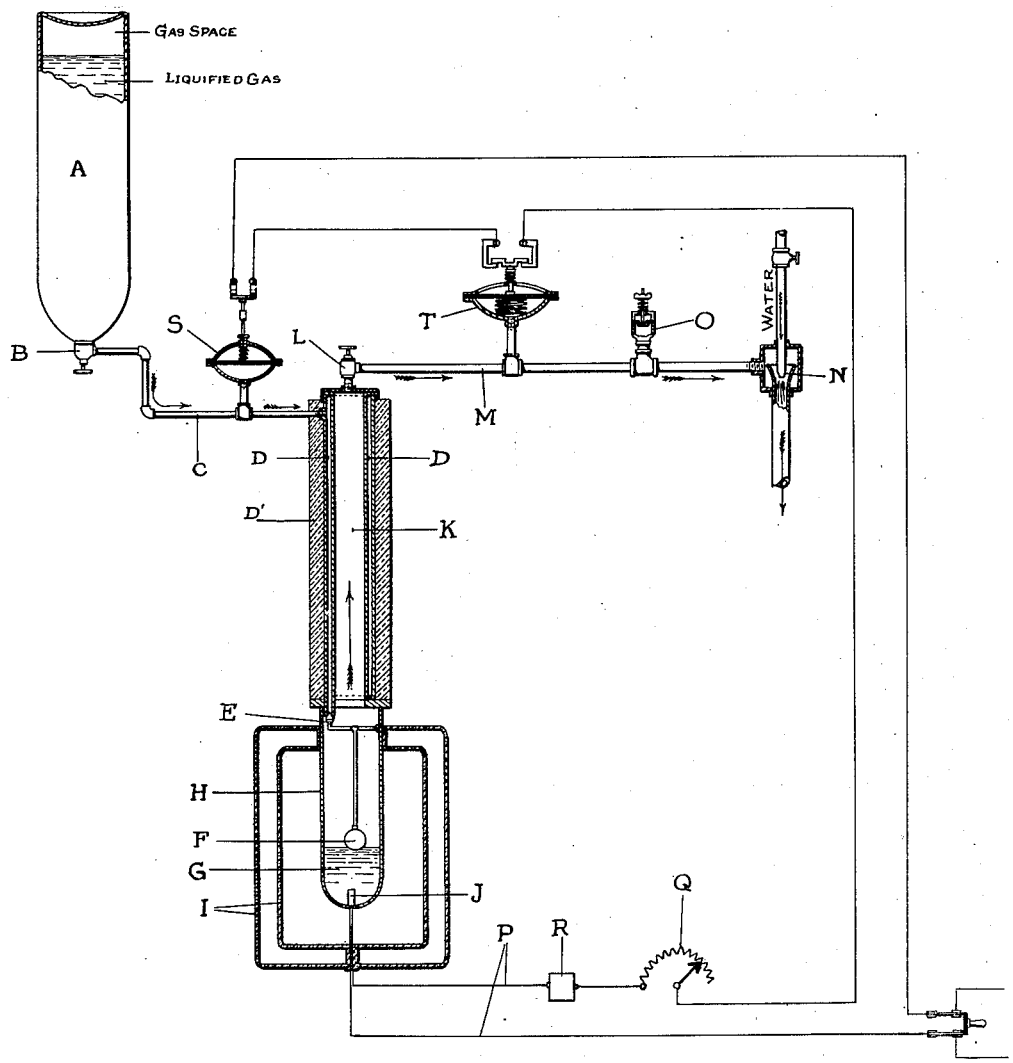
INVENTOR.
CLARK T. HENDERSON.
BY *Miller Boyken & Bried*
ATTORNEYS.

Patented May 24, 1932

1,859,442

UNITED STATES PATENT OFFICE

CLARK T. HENDERSON, OF BURLINGAME, CALIFORNIA

APPARATUS FOR CONTROLLING GAS FLOW

Application filed May 3, 1929. Serial No. 360,275.

This invention relates to a method and apparatus for controlling gas flow, and has for its objects improvements in such method and apparatus for accurately controlling the quantity of a gas flowing through a pipe for any use which may require a constant delivery of gas, particularly the control of flow of chlorine gas to a water stream for incorporation therein in the treatment of water, though the method and means may be applied to other gases for other purposes requiring such a controlled flow as produced through the use of my method and apparatus.

Briefly described my method comprises maintaining a body of liquefied gas, such as chlorine, in a receptacle surrounded by a vacuum chamber or other heat insulation, delivering a controllable electric current to a resistance element immersed in the liquid or in thermal contact with the receptacle so that definite or measured evaporation of the liquid will be assured. The outflowing gas is carried away in a duct in thermal contact with an inflowing stream of liquid chlorine on its way to the receptacle, and whereby an exchange of heat takes place between the inflowing liquid chlorine and outflowing chlorine gas with a result that the inflowing liquid chlorine reaches the receptacle at a constant temperature before being subjected to the measured heat delivery from the controlled electrical flow to the aforesaid resistance.

The apparatus for the method includes automatic cut-out of current supply actuated by drop in pressure of liquid supply feed and by excess pressure in outflowing gas duct, also minimum pressure control on said duct and a liquid operated aspirator for creating a negative pressure or suction in the gas duct and absorbing the gas into the aspirator liquid.

The drawing is a sectional dagrammatic elevation of the apparatus and in which A is an inverted cylinder containing any desired liquefied gas, in the present instance say chlorine, though no limitation is implied thereby as the method and apparatus will work with any liquefied gas from which it is desired to accurately generate and control the flow of gas.

At the bottom of the cylinder is a shut-off valve B discharging to a pipe C leading the liquid to the upper end of a vertically arranged narrow annular passageway D downwardly through a valve E controlled by a float F or any other suitable device for maintaining a constant level and volume G of liquid chlorine in receptacle H. The annular passage D is effectively heat insulated as indicated at D' by any suitable means.

Receptacle H is spaced within double walls I from between which the air is exhausted, and the air is preferably also exhausted from the space immediately surrounding the receptacle H so as to effect a vacuum bottle structure substantialy insuring against the transfer of any heat to the receptacle H from extraneous sources except such as is measured and delivered thereto.

To deliver a definite amount of heat to the liquid G I provide an electrical heating element as at J either immersed in the liquid or in thermal contact with receptacle H and through which element a controlled flow of electric energy is maintained.

The chlorine gas generated rises through a duct K within the annular liquid passage D and passes through a controlling valve L and pipe M to a water-operated aspirator N for absorption into the water. Controlling valve L is preferably an adjustable relief valve which may be set to maintain any desired pressure in the vertical duct K and evaporating receptacle.

The action of the aspirator induces a suction in pipe M and in order to hold this at constant value against variations in water flow an inwardly opening adjustable air valve is provided on the pipe M at O.

Current is delivered to the resistance element J through circuit P controlled by rheostat Q which may be adjusted to deliver a precise amount as recorded on an indicating watt meter R with which may be combined an integrating watt meter so as to record the total wattage delivered in a given interval of time, or if desired, a graphic recording watt meter may be used to preserve a chart of the flow at all times. Also, since a definite amount of heat generated in the element J will generate a corresponding amount of gas, it is evident that the watt meter may be graduated in terms of pounds of gas per hour instead of wattage or in addition thereto if desired.

Supply cylinder A will be under an internal pressure dependent on the nature of the liquefied gas, say about 85 pounds per square inch if chlorine at an average temperature of 75° F. and hence the liquid will always be forced through pipe C by gas pressure in space at top of cylinder A and when the supply of liquid is exhausted and pressure in line C falls it is desirable to discontinue the supply of electrical energy to the element J. Also, if for any reason the gas pressure in pipe M should increase to an excessive degree the electrical flow should stop, and to carry out the above a pressure-controlled switch S is installed on pipe C to open at drop in pressure and one at T on pipe M to open at rise of pressure, both switches are connected in the circuit in series as indicated on the diagram.

In practice, with chlorine water treatment, switch S is set to operate to maintain circuit closed at pressures in excess of say 15 pounds, and switch T is adjusted to keep the circuit closed as long as negative pressure in line M equals or exceeds say one inch of mercury with water aspirator in operation.

In considering the apparatus as described above, it will be seen that the vacuum chamber surrounding the liquefied gas receptacle makes the evolution of gas dependent almost entirely on the measured heat supplied by the electrical heating element. Liquid chlorine boils under one atmosphere pressure at a temperature of minus 33.6° C. Consequently with relief valve L set to open at pressure of one atmosphere the gas rising from the liquid in receptacle H at such pressure will be at the above mentioned temperature, whereas the liquid chlorine entering the annular passage D will be at ordinary room temperature, say, plus 20° C., and hence the gas from receptacle H in passing upward in duct K within the inner tube of the annular descending column of liquid, will absorb heat from the liquid so that by the time the gas reaches the top of duct K its temperature will have been raised to plus 20° C., while the temperature of the descending liquid upon reaching the bottom of passage D before passing into receptacle H will be lowered to approximately minus 33.6° C.

It is of course evident that the cylinder container may be kept at substantially constant uniform temperature by suitable means if desired.

It is evident that if controlling relief valve L is set to maintain a higher pressure in duct K and the evaporating receptacle, the evolution of gas will take place at a higher temperature and therefore reduce the heat insulation requirements and possible affect of extraneous heat.

The principal use of my method and apparatus for controlling gas flow is for chlorine in the treatment of municipal water supplies, and effluent from sewage disposal, and for which uses it is the practice to absorb chlorine in a stream of water in relatively high concentration for further merging with the major stream of water or liquid to be treated, but it is manifest that it is not limited to any particular gas control, as it would be of value for many other uses, such as in the dosage of grape loaded freight cars with sulphur dioxide evolved from the liquefied gas, also in fumigation with hydrocyanic acid gas generated from the liquefied gas, by the method and apparatus described.

I claim:

1. Apparatus for controlling gas flow which includes a heat insulated receptacle for a liquid adapted to emit gas upon an application of heat thereto, a duct for conducting gas from said liquid, an electrical resistance element arranged to transmit its heat to said liquid, and means for controlling at constant value an electrical current flowing through said element.

2. Apparatus for controlling gas flow which includes a receptacle for a liquid adapted to emit gas upon an application of heat thereto, a vacuum chamber substantially surrounding said receptacle, a duct for conducting gas from said liquid, an electrical resistance element arranged to transmit its heat to said liquid, and means for controlling at constant value an electrical current flowing through said element.

3. In apparatus as specified in claim 1, means for creating a suction on said duct, and means for breaking the current circuit controlled by the gas pressure in said duct.

4. Apparatus for controlling gas flow which includes a heat insulated receptacle for a liquid adapted to emit gas upon an application of heat thereto, a duct for conducting gas from said liquid, means for creating a suction in said duct arranged to draw gas therefrom for use, an electrical resistance element arranged to transmit its heat to said liquid, and means for controlling at constant value an electrical current flowing through said element.

5. Apparatus for controlling gas flow which includes a heat insulated receptacle for a liquid adapted to emit gas upon an application of heat thereto, a duct for conducting gas from said liquid, means for creating a suction in said duct arranged to draw gas therefrom for use, an inwardly opening relief valve on said duct adjustable to control the suction produced by said aspirator, an electrical resistance element arranged to transmit its heat to said liquid, and means for controlling at constant value an electrical current flowing through said element.

6. In apparatus as specified in claim 1 a source of supply of the liquid under pressure, automatically operated means for controlling feed of said liquid to said receptacle, and means for chilling said liquid to substantially constant temperature before admission to said receptacle.

7. In apparatus as specified in claim 1 a source of supply of the liquid under pressure, automatically operated means for controlling feed of said liquid to said receptacle, and means for chilling said liquid to substantially constant temperature before admission to said receptacle comprising a liquid passageway in thermal relation to said duct whereby heat interchange takes place between gas from said receptacle and liquid in said passageway.

8. In apparatus as specified in claim 1, a source of supply of the liquid under pressure, automatically operated means for controlling feed of said liquid to said receptacle, and means for chilling said liquid to substantially constant temperature before admission to said receptacle, and means controlled by pressure of the supply liquid arranged to break the current circuit upon a drop in said pressure.

9. In apparatus as specified in claim 1 a source of supply of the liquid under pressure, automatically operated means for controlling feed of said liquid to said receptacle, and means for chilling said liquid to substantially constant temperature before admission to said receptacle, and means controlled by pressure of the supply liquid arranged to break the current circuit upon a drop in said pressure, and means controlled by gas pressure in said duct arranged to break the current circuit upon a rise in said gas pressure.

10. Apparatus of the character described comprising a liquid evaporating receptacle, a gas duct extending upwardly therefrom, a liquid passage extending downwardly in thermal contact with said gas duct into said receptacle, a pressure liquid supply chamber discharging into said passage, means maintaining substantially constant quantity of liquid in said receptacle delivered from said passage, an electrical heating element arranged to deliver its heat to liquid in said receptacle, and means for maintaining a constant current flow through said heating element.

11. In an apparatus as specified in claim 10 a vacuum chamber substantially surrounding said receptacle and heat insulating walls surrounding both said passage and said duct.

CLARK T. HENDERSON.